United States Patent [19]

Blädel et al.

[11] Patent Number: 5,576,381
[45] Date of Patent: Nov. 19, 1996

[54] AQUEOUS DISPERSION OF FLUOROPOLYMERS, ITS PREPARATION AND USE FOR COATINGS

[75] Inventors: Hermann Blädel, Emmerting; Bernd Felix, Burgkirchen; Klaus Hintzer, Kastl; Gernot Löhr; Wolf D. Mitterberger, both of Burgkirchen, Germany

[73] Assignee: Hoechst Aktiengesellschaft, Germany

[21] Appl. No.: 346,410

[22] Filed: Nov. 29, 1994

[30] Foreign Application Priority Data

Dec. 1, 1993 [DE] Germany .......................... 43 40 943.1

[51] Int. Cl.$^6$ ........................................... C08L 27/12
[52] U.S. Cl. .......................... 524/544; 524/545; 524/546; 526/242; 526/247; 526/249; 526/250
[58] Field of Search ..................... 524/543, 544, 524/545, 546; 526/242, 247, 249, 250, 255

[56] References Cited

U.S. PATENT DOCUMENTS

| | | | |
|---|---|---|---|
| 3,142,665 | 7/1964 | Cardinal et al. | 260/92.1 |
| 3,790,403 | 2/1974 | Ribbans, III | 117/764 |
| 4,252,859 | 2/1981 | Concannon et al. | 428/422 |
| 4,369,266 | 1/1983 | Kuhls et al. | 523/332 |
| 4,391,940 | 7/1983 | Kuhls et al. | 524/458 |
| 5,219,910 | 6/1993 | Stahl et al. | 524/236 |

FOREIGN PATENT DOCUMENTS

| | | |
|---|---|---|
| 0525660 | 2/1993 | European Pat. Off. . |
| 4231865 | 3/1993 | Germany . |
| 1323527 | 7/1973 | United Kingdom . |

*Primary Examiner*—Edward J. Cain
*Attorney, Agent, or Firm*—Connolly & Hutz

[57] ABSTRACT

Aqueous dispersions of fluoropolymers which are obtained by emulsion polymerization, are not processsable from the melt and form a film on sintering, which comprise a fluoropolymer A) having an average particle size (number average) of from 180 to 400 nm and a fluoropolymer B) having an average particle size which is lower by a factor of from about 0.3 to about 0.7, so that the total dispersion has a non-monomadal number distribution of the particle diameter, are suitable for soaking, impregnating or coating surfaces, for example of fibers or planiform articles of fibers or porous materials, in particular for coating fiberglass fabrics, and also for the formulation of metal coating systems.

18 Claims, No Drawings

AQUEOUS DISPERSION OF FLUOROPOLYMERS, ITS PREPARATION AND USE FOR COATINGS

DESCRIPTION

The invention relates to aqueous dispersions of fluoropolymers which are obtained by emulsion polymerization, are not processable from the melt and form a film on sintering, which comprise a fluoropolymer A) having an average particle size (number average) of from 180 to 400 nm and a fluoropolymer B) having an average particle size which is lower by a factor of from about 0.3 to about 0.7, so that the total dispersion has a non-monomodal number distribution of the particle diameter.

The invention further relates to processes for preparing such dispersions and their use for coatings. Further details and preferred embodiments of the invention are described below.

The fluoropolymers used are obtained by the known process of emulsion polymerization and cannot be processed from the melt, i.e. they have a melt viscosity (shear viscosity) at 372° C. of from ≧ 0.01 GPas, frequently from ≧ 1 GPas, up to about 900 GPas. Such polymer powders cannot be processed from the melt using conventional processing methods for fluorothermoplastics. The melt viscosity is determined by the creep test method of Ajroldi et al., described in J. appl. Polym. Sci. 14 (1970) 79 ff. The method is described in more detail in U.S. Pat. No. 4,036,802, column 9, line 46 to column 10, line 41.

The specified average particle sizes are number averages of the particle diameter of the largely spherical particles, which averages are obtained by counting the particle diameters which can be measured in the electron micrograph of the dispersion. In the case of non-spherical particles, the particle diameter is taken as the geometric mean of the two main axes.

Preferably, the fluoropolymer A) has an average particle size of from 180 to 300 nm and the fluoropolymer B) has an average particle size of from 50 to 150 mm.

Based on the polymer solids content, the preferred dispersions of the invention contain from 50 to 95% by weight, in particular from 70 to 95% by weight, of fluoropolymer A) and from 5 to 50% by weight, preferably from 5 to 30% by weight, in particular from 5 to 20% by weight, of fluoropolymer B).

The content of fluoropolymer solids can vary within wide limits in the dispersions of the invention, for example from 10 to 80% by weight. It is preferably in the range from 30 to 65% by weight. Besides the specified fluoropolymers A) and B), the dispersions of the invention can also contain further fluoropolymers which are compatible with the fluoropolymers A) and B) and do not interfere in the intended application. Such fluoropolymers, which can be regarded as fillers, are not included both here and in what follows when reference is made to the polymer solids content. This term therefore refers only to the sum of the fluoropolymers A) and B) used according to the invention.

The fluoropolymers A) and B) have to be different only in respect of their average particle size, but can be the same in respect of their gross composition, the morphological particle structure and the molecular weight.

The fluoropolymers A) and B) should form a film on sintering, but not be fluorothermoplastics which can be processed from the melt by conventional methods. Preferred fluoropolymers are "modified" polytetrafluoroethylenes, i.e. copolymers of tetrafluoroethylene and small amounts of modifiers such as hexafluoropropene, chlorotrifluoroethylene and perfluoro(alkyl vinyl ethers) containing perfluoroalkyl groups having from 1 to 4 carbon atoms, in particular the n-perfluoropropyl group. These comonomers or modifiers can be present in the copolymer in amounts of up to 2 mol %, with a higher modifier content also being permissible if the molecular weight is sufficiently high for the copolymer to be not processable from the melt. Such copolymers generally have a melting point above 290° C.

Suitable polymers are described, for example, in U.S. Pat. No. 4,391,940. The polymers described there have an inhomogeneous structure of the polymer particle, comprising a core, an inner shell which is chemically different therefrom and an outer shell which is again different therefrom. Such particles can be regarded as examples of qualitatively inhomogeneous particles. Also known are quantitatively inhomogeneous particles in which the core and the adjacent shell or shells differ, for example, only by a different modifier content.

Coating systems containing such fluoropolymers have been known for a long time, for example from U.S. Pat. No. 3,142,665, 3,790,403, 4,252,859 and EP-A 525 660. They are used, for example, for coating metal surfaces and glass fabrics where, depending on the application, the anti-adhesion property, the dirt repulsion or the weathering resistance of the fluoropolymers is of primary importance.

U.S. Pat. No. 3,790,403 describes the problems which can occur if the fluoropolymer is applied too thickly or too quickly, in particular crack formation. In the process described therein, a glass fabric is therefore first coated with a polytetrafluoroethylene dispersion and a coating of a tetrafluoroethylene copolymer which can be processed from the melt is applied over this. On sintering the base coat, the topcoat then also melts, which is supposed to reduce crack formation. However, the copolymers which can be processed form the melt and are required for the topcoat are expensive because of the relatively high modifier content. In addition, the coatings thus obtained are relatively stiff and not suitable for all applications. In contrast, according to the invention cheaper fluoropolymers can be used. Furthermore, the inventive concept with its fluoropolymer components of differing particle size offers the possibility of flexibly matching the properties of the coating to the desired purpose in each case.

The dispersions of the invention are obtained, in the simplest case, by mixing aqueous dispersions of fluoropolymer A) with a corresponding dispersion of fluoropolymer B). The proportion of the two fluoropolymers is determined by the desired field of application and can, if required, be easily established by simple preliminary experiments. The proportion of the component present in the lesser amount has to be sufficiently large for the total dispersion to have a non-monomodal number distribution of the particle diameter.

The finely divided fluoropolymer component B) can advantageously be obtained by a process for seed polymerization, as is described, for example, in U.S. Pat. No. 4,391,940. Since the preparation of such a seed is more complicated than the preparation of a dispersion having coarser particles (for a lower solids content, a higher addition of expensive emulsifier is required), the fluoropolymer B) is generally used in the lesser amount out of economic considerations alone. Furthermore, the viscosity of the concentrated dispersion mixture generally increases with increasing proportion of the finely divided fluoropolymer B), which is usually not advantageous for processing.

Besides the subsequent mixing of the fluoropolymer components A) and B), the dispersions of the invention can also be obtained by an appropriate polymerization procedure, by taking measures during the polymerization to initiate a new generation of particles. The initiation of new generations of particles is known, for example in continuous emulsion polymerizations (Polymer Reaction Engineering, Ed. Reichert and Geiseler, Hüthig & Wepf, 1986). In batchwise processes, the formation of a new generation of particles can be initiated by subsequent supplementation of the batch or by subsequent addition of emulsifier during the polymerization.

As already mentioned above, the solids content of fluoropolymer in the dispersion of the invention can vary within wide limits. For many applications, and also to reduce the transport volume, more concentrated dispersions are used than are obtained by mixing of the individual dispersions or in an appropriate polymerization procedure to give a bimodal particle size distribution. In these cases, the dispersion is concentrated by methods known per se. A suitable method is, for example, ultrafiltration (U.S. Pat. No. 4,369,266), in which anionic surfactants of the sodium dodecylsulfonate or nonionic surfactants of the ethoxylated alkylphenol type being customarily added. Particularly advantageous are relatively long-chain alkylaminoxides (U.S. Pat. No. 5,219,910) which are readily biodegradable.

If the dispersions of the invention are obtained by mixing aqueous dispersions of the individual components, concentration is advantageously carried out after mixing the components. It has surprisingly been found that the viscosity of the dispersion after mixing the two dispersions of the fluoropolymers A) and B) is lower than that of the dispersion A). The mixing in of the dispersion B) thus effects a greater reduction in the viscosity than the addition of a corresponding amount of water. Furthermore, ultrafiltration after prior mixing of the two dispersions of the fluoropolymers A) and B) is possible to higher solids contents without coagulation than is possible for the dispersions of the components.

The amount of the surfactants added depends on the type of concentration process and also on the future applications. In general, it is in the range from 4 to 15% by weight, based on the polymer solids content. If the dispersions of the invention are intended, for example, for metal coating, then a relatively low surfactant content of about 5% by weight is sufficient. For the coating of fiberglass fabrics, a surfactant content of from 9 to 11% by weight is usually required. In these cases, the surfactant selected is one which is easily removed during or after the film formation during sintering.

It has already been mentioned above that the dispersions of the invention can, in addition to the fluoropolymers A) and B), contain further fluoropolymers which can act as fillers. Fillers customarily used are pigments, glass spheres or fibrous fillers such as carbon fibers. Based on the polymer solids content, the total amount of filler is up to about 40% by weight, preferably from 10 to 25% by weight.

The dispersions of the invention can also contain further constituents which depend on the intended application. If the dispersions are intended, for example, for metal coating, then they can contain the customary binder resins. Suitable resins are film formers selected from the group consisting of polyamides, polyimides and polyamidimides. Such formulations can also contain the usual additives such as polyphenylene sulfide and the like.

The dispersions of the invention are suitable for the production of coatings on smooth, porous or fibrous materials, for example for soaking or impregnation of planiform or non-planiform fibrous materials or porous materials, for example of graphite. Smooth substrates which may be mentioned are surfaces of metal, ceramic, glass or plastic. As already mentioned, in the coating of metals the required binder resin can be added to the dispersion of the invention or else the metal surface can be pretreated in a known manner.

A preferred field of application is the coating of fiberglass fabrics. In comparison with treatment with comparable dispersions of the individual components, the dispersions of the invention allow the desired layer thicknesses to be achieved in significantly fewer process steps without the formation of cracks or nonuniform films. The use of the dispersions of the invention hence gives a considerable saving of process steps and thus an appreciable saving of time and money. This advantage does not have to be achieved at the expense of quality, but rather the films obtained according to the invention have a dense structure and greater hardness than the coatings obtained using the individual components.

The invention is illustrated by the following examples. Percentages are by weight unless indicated otherwise.

EXAMPLE 1

Preparation of the Component B1

The emulsion polymerization is carried out at a constant temperature of 35° C. and a constant tetrafluoroethylene (TFE) pressure of 15 bar in a 150 l reactor. The reactor is charged with 100 l of deionized water containing 90 g of ammonium perfluorooctanoate, 25 g of 25% strength aqueous $NH_3$ solution and 0.43 g of sodium bisulfite. The reactor contents are freed of atmospheric oxygen by alternate flushing with $N_2$ and evacuation. 200 g of hexafluoropropene (HFP) are then metered in and the pressure is set to 15 bar using TFE gas. The reaction is started by metering in 300 ml of a solution containing 2.0 g of ammonium persulfate (APS) and 0.075 g of $CuSO_4.5H_2O$ over a period of 10 minutes. The TFE pressure is kept constant by further introduction of TFE. The amount of TFE reacted is continuously measured. When 11 kg of TFE have reacted, the TFE supply is interrupted, the reactor is depressurized and the residual monomer is removed by evacuation.

The raw dispersion obtained has a solids content of 10%, the polymer a HFP content of 0.45%, the average particle size is 100 nm.

The HFP content is determined IR-spectroscopically by measurement of the absorption at 982 $cm^{-1}$ using 2360 $cm^{-1}$ as reference band. Multiplying the quotient of the two absorptions by 4.5 gives the result in percent by weight.

The average particle size is here measured indirectly by inelastic light scattering using an apparatus from Malvern Instruments, calibrated by electron microscopy. The figure given is the number average.

EXAMPLE 2

Preparation of the Component B2

Example 1 is repeated, but 300 g of perfluoro(propyl vinyl ether) (PPVE) is added in place of HFP.

The PPVE content of the polymer is 0.9%, the average particle size is 110 nm.

The PPVE content is obtained by multiplying the quotient of the absorptions at 995 cm$^{-1}$ and 2360 cm$^{-1}$ by the factor 0.95.

EXAMPLE 3

Preparation of the Component A

The preparation of this component is carried out by a method similar to the process described in U.S. Pat. No. 4,391,940 in the form of a so-called seed polymerization. The seed used is the raw dispersion obtained in accordance with example 1.

A 150 l reactor is charged with 20 l of raw dispersion in accordance with example 1, 80 of deionized water, 80 g of 25% strength aqueous NH$_3$ solution, 2.5 g of diethylene glycol and 75 mg of CuSO$_4$.5H$_2$O. The reactor contents are freed of atmospheric oxygen by evacuation and flushing with N$_2$. The temperature is set to 40° C. and the TFE pressure is set to 15 bar. 0.75 g of APS, dissolved in 300 ml of H$_2$O, is then metered in. The reaction is started by continuous metered addition of 1 l of an aqueous solution containing 0.25 g of azodicarboxydiamide (ADA) dissolved in 25 ml of 10% strength NaOH solution. The metered addition is carried out in such a way that the polymerization rate does not drop.

When the amount of TFE reacted reaches 23.5 kg, the metered addition of ADA is interrupted. 0.2 g of APS, 75 mg of CuSO$_4$.5H$_2$O, dissolved in 100 ml of H$_2$O, and 0.2 g of sodium bisulfite, likewise dissolved in 100 ml of H$_2$O, are then metered in quick succession. The reaction rate rises considerably as a result. 250 g of HFP are then metered in, which makes the reaction rate decrease greatly. If 1.5 kg of TFE have been absorbed after this metered addition, the reaction is stopped by turning off the stirring and depressurizing the reactor. The residual monomer is removed by conventional methods. This gives a dispersion having a solids content of 20.7% and an average particle size of about 220 nm. The HFP content of the polymer is 0.043%. The latex particles are built in three shells, with the outer shell making up about 5%.

EXAMPLE 4

Concentration

The raw dispersions obtained in accordance with the examples 1 and 3 are mixed in such a way that the dispersion having a coarser particle size from example 3 contributes 90% to the total polymer. This mixture is admixed with 11% of ethoxylated nonylphenol containing 10 ethylene oxide units, based on fluoropolymers, and the pH of the mixture is adjusted to about 9 using 25% strength aqueous NH$_3$ solution. The mixture thus prepared is subjected to ultrafiltration as described in U.S. Pat. No. 4,369,266 and is thereby concentrated to a polymer content of 58%.

In addition, the raw dispersions are separately concentrated in a circulation evaporator after admixture with the corresponding amount of ethoxylated nonylphenol containing 10 mol of ethylene oxide units. The dispersions thus obtained and having a polymer content of 50% are used to prepare other mixtures.

The individual components and their various mixtures are tested in fiberglass fabric coatings both as such and also in the presence of 20% of glass spheres (d=50 μm).

EXAMPLE 5

Coating of Glass Fabric

A partially desized light glass fabric (type 91121, Interglas, Ulm) having a weight per unit area of 200 g/m$^2$ is impregnated with a dispersion by means of a coating apparatus, dried and sintered. The feed rate is 0.3 m/min, the temperatures of the heating zones are about 150° C., 280° C. and 400° C. The applied coating is visually assessed for the occurrence of cracks or hairline cracks. The dispersions or dispersion mixtures shown in Table 1 all have the same polymer content, namely 58%, and the same content of ethoxylated nonylphenol (as described above), namely 11%, based on the polymer. The proportion by weight of the coating is determined gravimetrically.

The coating procedure is repeated until an applied amount of > 55% is achieved. For this purpose, six coats are generally needed.

Table 1 shows that applied amount in percent by weight above which hairline cracks occur.

TABLE 1

| % by weight of Component A | Component B | Amount applied [% by weight] | Assessment |
|---|---|---|---|
| 100 | B1 | 38.9 | Hairline cracks |
| 95 | B1 | 50.1 | Hairline cracks |
| 90 | B1 | 58.2 | Free of cracks |
| 80 | B1 | 45.1 | Hairline cracks |
| 70 | B1 | 46.1 | Hairline cracks |
| 50 | B1 | 39.5 | Hairline cracks |
| 0 | B1 | 28.8 | Hairline cracks |
| 95 | B2 | 48.4 | Hairline cracks |
| 90 | B2 | 49.5 | Hairline cracks |
| 82 | B2 | 59.3 | Free of cracks |
| 70 | B2 | 50.3 | Hairline cracks |
| 0 | B2 | 29.2 | Cracks |

EXAMPLE 6

The coating procedure was carried out on a partially desized, so-called heavy glass fabric (type B 18030, Verseidag, Krefeld) having a weight per unit area of 360 g/m$^2$ under comparable conditions to example 5. However, in the second coat, 20% by weight of glass spheres having d=50 μm (type 3000, Ballotini, Italy) and also 0.5%, in each case based on the fluoropolymer, of acrylate thickener (®VISCALEX VG 2, Allied Colloids, Hamburg) were added to the dispersion.

Table 2 summarizes the results for the individual coats.

TABLE 2

| | 90% A) + 10% B1) | | |
|---|---|---|---|
| Coat | Filler | Amount applied [% by weight] | Assessment |
| 1 | — | 28.4 | Free of cracks |
| 2 | 20% glass spheres | 40.7 | Free of cracks |
| 3 | — | 46.8 | Free of cracks |
| 4 | — | 51.8 | Free of cracks |

Table 3 shows the result for the component A).

TABLE 3

| | 100% component A) | | |
|---|---|---|---|
| Coat | Filler | Amount applied [% by weight] | Assessment |
| 1 | — | 28.4 | Free of cracks |
| 2 | 20% glass spheres | 42.3 | Free of cracks |
| 3 | — | 45.5 | Hairline cracks |
| 4 | — | 46.1 | Hairline cracks |
| 5 | — | 49.8 | Hairline cracks |
| 6 | — | 52.0 | Hairline cracks |

This example demonstrates not only the better quality of the dispersion mixture of the invention, but also that the desired amount applied of over 50% can be achieved with only four coats. To this coating there is applied, in a known manner, a mixture of a dispersion of a copolymer comprising 96% of tetrafluoroethylene and 4% of perfluoro(n-propyl vinyl ether), referred to hereinafter as "PFA", and of polytetrafluoroethylene, to make the welding of individual strips of fabric possible. The total amount applied should here be over 55%, which can only be achieved by prior crack-free application of more than 50% of fluoropolymers.

EXAMPLE 7

Metal Coating

In the following, the percentages are based on the respective solids content in the specified composition. "Wetting agent" means an ethoxylated octylphenol having 10 ethylene oxide units. "Polyamidimide" means poly(2,4,5-triketoimidazolidino-diphenylmethano-N,N'-diphenylmethano-bis-imino-trimellitamide), prepared by reacting the reaction product of trimellitic anhydride and 4,4'-diaminodiphenylmethane with 4,4'-bisethoxyalkylaminodiphenylmethane and 4,4'-diisocyanatodiphenylmethane. To make it dilutable with water, this product is reacted with an aqueous solution of a tertiary amine.

A sand-blasted aluminum pan is coated with an aqueous primer, comprising a mixture of 5% of polyamidimide, 4% of wetting agent, 1.5% of carbon black pigment, 3% of xylene and 25% of PFA (in the form of a 50% strength dispersion), and is dried at 90° C. Onto this layer is applied the following aqueous topcoat formulation: 3% of polyamidimide, 1.2% of wetting agent, 2% of carbon black pigment, 6% of xylene and 40% of fluoropolymer (in the form of a 58% strength dispersion). The coating is dried at 90° C. and then at 280° C. and is subsequently sintered for 15 minutes at 400° C. The fluoropolymer dispersion used was, on the one hand, a mixture of the invention comprising 90% of component A) and 10% of component B1) and, on the other hand for comparison, 100% of the component A).

On the coatings thus produced, the hardness was measured in accordance with the French standard NF D 21.511, item 3.6, at room temperature and in each case on 20 pans. In this measurement procedure, the measure for the hardness is that weight with which the spherical probe is loaded to make it penetrate through the coating.

When using the fluoropolymer mixture of the invention (in the topcoat) the weight required was 1.8 kg, for the pure component A) it was 1.3 kg (average values).

The dispersion of the invention thus significantly improves the hardness measured in this way.

We claim:

1. An aqueous fluoropolymer dispersion comprising:
   A) a first dispersed solid fluoropolymer having an average particle size, on a number average basis, of from 180 to 440 nm, and
   B) a second dispersed solid fluoropolymer having an average particle size which is lower than that of said first dispersed fluoropolymer by a factor of from about 0.3 to about 0.7, so that the total dispersion has a non-monomodal number distribution of the particle diameter, said first and second fluoropolymers having been obtained by emulsion polymerization, being not processable from the melt, and forming a film upon sintering.

2. Dispersion as claimed in claim 1, wherein said first dispersed solid fluoropolymer comprises from 50 to 95% by weight of the total weight of said first and second dispersed solid fluoropolymers.

3. Dispersion as claimed in claim 2, wherein said first dispersed solid fluoropolymer comprises from 70 to 95% by weight of said total weight.

4. Dispersion as claimed in claim 1, wherein the second dispersed solid fluoropolymer comprises from 5 to 20% by weight of said total weight.

5. Dispersion as claimed in claim 1, wherein the total weight of said first and second solid fluoropolymers comprises from 10 to 80% by weight of said dispersion.

6. Dispersion as claimed in claim 5, wherein said total weight comprises from 40 to 65% by weight of said dispersion.

7. Dispersion as claimed in claim 1, wherein said first dispersed solid fluoropolymer has an average particle size of from 180 to 300 nm.

8. Dispersion as claimed in claim 1, wherein said second dispersed solid fluoropolymer has an average particle size of from 50 to 150 nm.

9. Dispersion as claimed in claim 1, which comprises, based on the total weight of said first and second solid fluoropolymers, from 4 to 15% by weight of a surfactant.

10. Dispersion as claimed in claim 1, which comprises, based on the total weight of said first and second solid fluoropolymers, up to 40% by weight of at least one filler.

11. Dispersion as claimed in claim 10, wherein the filler content is from 10 to 25% by weight.

12. A process for preparing an aqueous fluoropolymer dispersion as claimed in claim 1, which comprises
   mixing an aqueous dispersion comprising said first dispersed solid fluoropolymer with an aqueous dispersion comprising said second dispersed solid fluoropolymer, to obtain a mixture comprising a plurality of dispersions, and, optionally, concentrating said mixture to a desired total content of said first and second dispersed solid fluoropolymer.

13. A process as claimed in claim 12, wherein said mixture is concentrated to a said total solids content of from 40 to 65% by weight.

14. A process for soaking, impregnating or coating a surface of a substrate, which comprises contacting said substrate with a dispersion as claimed in claim 1.

15. A process for the formulation of a metal coating system, which comprises incorporating into said system a dispersion as claimed in claim 1.

16. A process for soaking or impregnating fibers or a planiform fibrous article or a non-fibrous but porous material, which comprises contacting the fibers or article or material with a dispersion as claimed in claim 1.

17. A process for coating a fiberglass fabric, which comprises contacting the fabric with a dispersion as claimed in claim 1.

18. Dispersion as claimed in claim 1, wherein said first and second fluoropolymers each have a melt viscosity at 372° C. which is $\geq 0.01$ GPas.

* * * * *